(12) United States Patent
Yates et al.

(10) Patent No.: US 9,317,616 B1
(45) Date of Patent: Apr. 19, 2016

(54) DYNAMIC WEB UPDATES BASED ON STATE

(75) Inventors: Andrew Joseph Yates, Seattle, WA (US); Daniel I. R. Cordell, Seattle, WA (US); James M. Cook, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 172 days.

(21) Appl. No.: 13/529,464

(22) Filed: Jun. 21, 2012

(51) Int. Cl.
*G06F 17/30* (2006.01)
*G06Q 30/02* (2012.01)
*G06Q 30/06* (2012.01)
*H04L 29/08* (2006.01)

(52) U.S. Cl.
CPC .......... *G06F 17/30873* (2013.01); *G06Q 30/02* (2013.01); *G06Q 30/06* (2013.01); *H04L 29/0809* (2013.01)

(58) Field of Classification Search
CPC ............. H04L 29/0809; G06F 17/30873; G06Q 30/02; G06Q 30/06
USPC .................................................. 715/738, 962
See application file for complete search history.

(56) References Cited

U.S. PATENT DOCUMENTS

| | | | |
|---|---|---|---|
| 6,222,857 B1 * | 4/2001 | Kammer et al. | 370/469 |
| 6,496,932 B1 * | 12/2002 | Trieger | H04L 29/06 380/277 |
| 7,603,430 B1 * | 10/2009 | Artz et al. | 709/217 |
| 7,707,226 B1 * | 4/2010 | Tonse | 707/796 |
| 7,895,296 B1 * | 2/2011 | Dayan | 709/219 |
| 8,307,031 B1 * | 11/2012 | Grieve | 709/203 |
| 2003/0079039 A1 * | 4/2003 | Forkner | H04L 29/06 709/237 |
| 2003/0080994 A1 * | 5/2003 | Yepishin et al. | 345/738 |
| 2004/0117349 A1 * | 6/2004 | Moricz | 707/1 |
| 2005/0262098 A1 * | 11/2005 | Manfredi et al. | 707/10 |
| 2006/0123230 A1 * | 6/2006 | Hewett et al. | 713/164 |
| 2007/0150556 A1 * | 6/2007 | Fukuda et al. | 709/219 |
| 2008/0134211 A1 * | 6/2008 | Cui | 719/318 |
| 2008/0282175 A1 * | 11/2008 | Costin et al. | 715/760 |
| 2008/0313206 A1 * | 12/2008 | Kordun | G06F 17/30884 |
| 2009/0070392 A1 * | 3/2009 | Le Roy et al. | 707/203 |
| 2010/0088612 A1 * | 4/2010 | Jia et al. | 715/745 |

OTHER PUBLICATIONS

Ousterhout et al., "Managing State for Ajax-Driven Web Components," USENIX Conference on Web Application Development, Jun. 23-24, 2010, 13 pages.*

Ryan, "Maintaining State with Ajax," retrieved on Feb. 10, 2014, from http://www.draconis.com/blog/2006/06/19/maintianing-state-with-ajax/, Jun. 19, 2006, 2 pages.*

(Continued)

*Primary Examiner* — Eric J Bycer
(74) *Attorney, Agent, or Firm* — Lee & Hayes, PLLC

(57) ABSTRACT

Some examples provide for content updates based on the state of content described at least partially in a markup language and caused to be displayed in a browser window. A web application causes the content to be displayed and tracks state changes of the content caused by user interactions with the displayed content. The web application causes the display of updates to the content that are received responsive to requests sent based on the user interactions. The web application can exclude from display those updates that are associated with an outdated state of the content.

19 Claims, 3 Drawing Sheets

(56) References Cited

OTHER PUBLICATIONS

"Sequencing Ajax requests on 'send-last basis,'" retrieved on Feb. 10, 2014, from the Internet Archive of the Aug. 20, 2011 http://live.julik.nl/2011/07/ajax-sequencing, 2 pages.*

Thwaits, Lorin, "Handling timeouts gracefully in Ajax using client-side code," retrieved from the Internet Archive (www.archive.org) on Jan. 26, 2015, of an archived copy created Jul. 24, 2010, of http://geekswithblogs/lorint/archive/2006/03/07/71625.aspx, 3 pages.*

* cited by examiner

DYNAMIC WEB UPDATES BASED ON STATE

BACKGROUND

Conventional static web browsing allows users to navigate between static web pages to view new content. Asynchronous JavaScript and XML (Ajax) applications execute within a browser window to display a dynamic web page that loads new content updates without loading entirely new web pages. As a user navigates within a dynamic web page, an Ajax application causes a new view port or window to be viewable in order to display new content updates within the dynamic web page. User interaction within the web page sometimes results in asynchronous requests for content updates being sent to a remote source, such as an Internet web server. The requests are asynchronous because the Ajax application allows the user to interact with the dynamic web page while the Ajax application receives and displays the content updates onto the dynamic web page.

Out-of-order Ajax responses may result in "broken" web pages, where content update is displayed in the wrong location. There have been some attempts to solve the problem of out-of-order Ajax responses. For example, serializing the Ajax responses enables the Ajax application to track the order of Ajax requests, and to display content updates associated with Ajax responses in the precise order in which they were requested.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As noted above, out-of-order Ajax responses in a dynamic web page result in "broken" web pages. A "broken" web page includes a content update that the user is not expecting, or that is in the wrong context, thereby resulting in incorrect or confusing information. In the context of a web store, for example, a user who becomes impatient waiting on a detail view for an item for sale may select the "back" button to return to a home view of the web store. If the content update associated with the back button is displayed before one or more Ajax responses associated with the detail view is received, the result could be the displaying of some content updates from the detail view within the context of the home view, which could be misleading or confusing to the user.

Embodiments of the present disclosure track a state of content—such as a dynamic web page—that is described at least partially by a markup language and discard responses that are received for an outdated state of the content without displaying them. A list of user interactions that cause a state change of the content is used to determine a current state of the content based on user interactions with the content. Requests for updates to the content are made responsive to the user interactions. Updates that are received in response to the user interactions associated with a current state of the content are displayed. Embodiments refrain from displaying updates associated with outdated responses.

As used herein, a "dynamic webpage" includes web pages with content that result from the execution of a web application, such as an asynchronous web application within a web view container of a native application—such as a browser or other application—designed to display content described at least partially in a markup language, such as HyperText Markup Language (HTML). The web application executes within a browser window to load content updates without loading new web pages. The web application may provide the appearance of loading new web pages, without actually doing so, by requesting and receiving content updates and displaying the updates within a new view port of view window of the browser window. Embodiments include applications written according to one or more of the various Asynchronous JavaScript and XML (Ajax) technologies.

Although embodiments are described herein with reference to "dynamic web pages," asynchronous web applications, and Ajax technologies, this is for the ease of description only. Embodiments are not limited to tracking the state of updates to web pages and embodiments are not limited to asynchronous applications and Ajax technologies. Other content types and technologies may be utilized without departing from the scope of the present disclosure.

The techniques and systems described herein may be implemented in a number of ways. Example implementations are provided below with reference to the following figures.

Illustrative Environment

Figure 1:
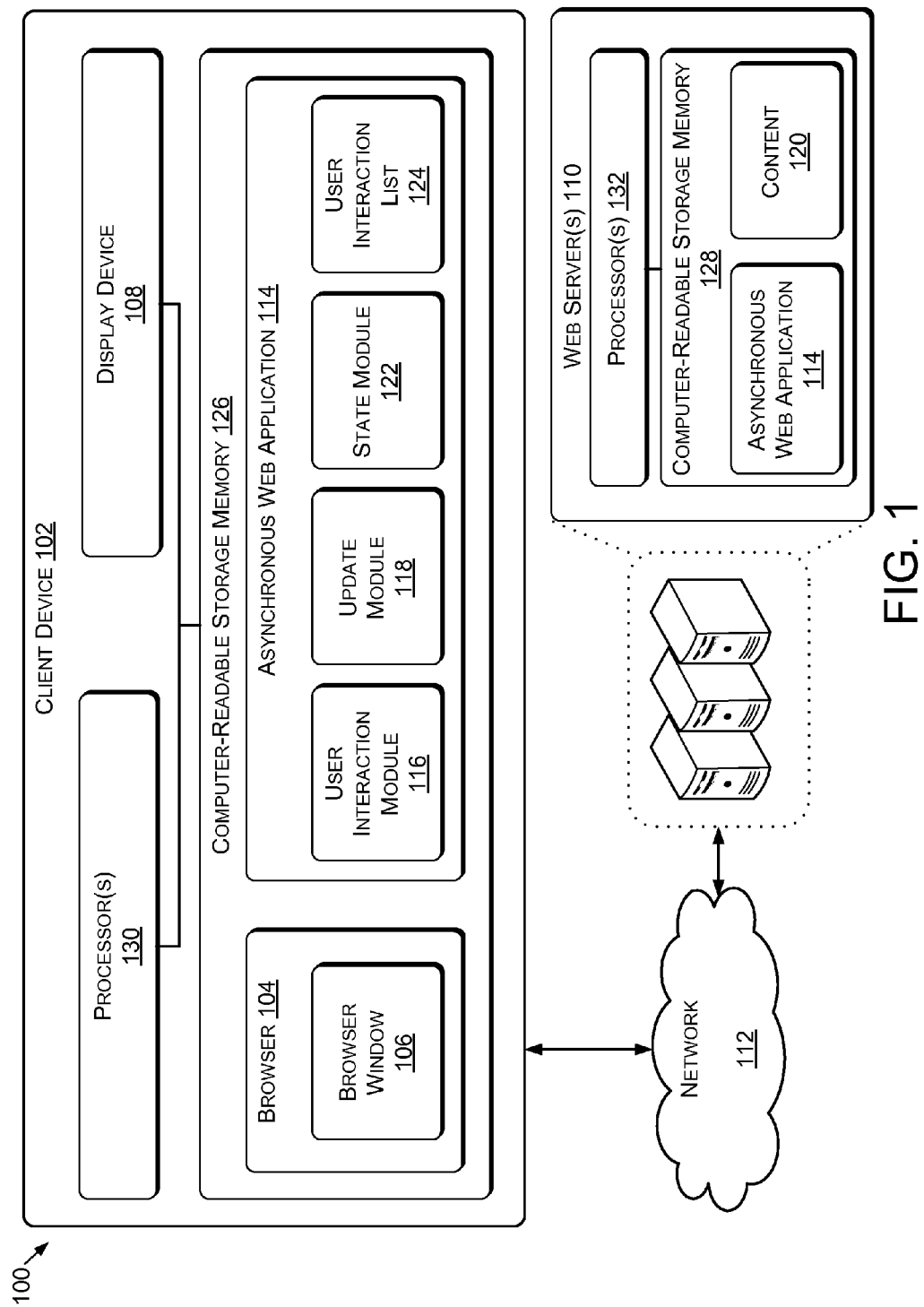
FIG. 1 shows an environment for providing a dynamic web content update.

FIG. 1 shows an environment 100 for providing a dynamic web content update. The client device 102 may be an end-user device such as a personal computer, smartphone, tablet computer, laptop computer, netbook, or any other device capable of displaying dynamic web pages. A browser 104 is configured to download web pages, including conventional and dynamic web pages, into a browser window 106 which are displayed on a display device 108. The web pages may be downloaded from a remote source, such as one or more web server(s) 110, over a network 112, which may include one or more of wireless networks, the public Internet, wide area networks, local area networks, or other network type. The display device 108 may be a computer monitor, liquid crystal display, plasma display, a touch-sensitive display, and the like. The web pages may implement a web store, a weblog, a social networking site, news source, and so forth.

The browser 104 may retrieve an asynchronous web application 114 from the web server(s) 110. The asynchronous web application 114 is configured to execute within the browser window 106 in order to implement a dynamic web page. The asynchronous web application 114 may be an Ajax application, or other asynchronous application type, configured to execute within a browser. The dynamic web page implemented by the asynchronous web application 114 enables the user to navigate and interact with the dynamic web page. Upon selection of a hyperlink within the dynamic web page, the asynchronous web application 114 is configured to alter the view port or window and display a new content update. From the user's perspective, it appears to behave in a manner that is similar to the behavior of a conventional static web site, which loads new web pages upon selection of browser hyperlinks.

A user interaction module 116 receives data indicative of user interactions with the dynamic web page. The data may include one or more of mouse clicks, user taps or gestures on a touch-sensitive display, keyboard input, voice input, pointer data, and so forth. The user interaction module 116 interacts with an update module 118 to request content 120 from the web server(s) 110.

The update module 118 requests updates from the content 120 from the web server(s) 110 based on the user interactions. For example, a user may select a link for a new view window of the dynamic web page. The content update for the new window may already be loaded onto the client device 102. If the content update for the new window has not been previously loaded on the client device, the update module 118 issues an asynchronous request to the web server(s) 110 for the content update for the new window based on the user interaction that makes a selection to view the content update for the new window. As used herein, an asynchronous web application, such as asynchronous web application 114, requests some portion of the content 120 from the web server(s) 110 without prohibiting the user from further interaction with the dynamic web page. It thus retrieves a new content update for the dynamic web page without interfering with the display or functioning of the dynamic web page.

A state module 122 keeps track of a current state of the dynamic web page based on the user interactions. Certain user interactions may cause a state change of the dynamic web page. For example, selecting a new window of the dynamic web page, selecting a "back" button, requesting a shopping cart check-out view, requesting video or audio content, and other user interactions may cause a state change of the dynamic web page. The state module 122 refers to a user interaction list 124 to determine those user interactions that cause a state change of the dynamic web page. Upon determining that the user interaction results in a state change, the state module 122 updates a current state of the dynamic web page to reflect the new change. As used herein, updating a current state of the dynamic web page refers to storing a current state in working memory, such as in a state file, rather than actually changing the state of the dynamic web page as displayed. The actual state of the dynamic web page as displayed occurs when the requested portions of the content 120 are received and caused to be displayed.

The update module 118 keeps track of the asynchronous requests and their corresponding responses, and correlates the asynchronous requests/responses with various states of the dynamic web page. The state module 122 therefore prevents portions of the content 120 associated with an outdated state of the dynamic web page from being displayed on the display device 108 after a user interaction causes a state change in the dynamic web page. This prevents out-of-order asynchronous responses from being displayed. It may also prevent the display of outdated updates that are received in the correct order. This results in improved efficiency by not displaying a content update that the user is no longer interested in viewing.

Some user interactions may not cause a state change of the dynamic web page, such as a selection to play content within a current view window, a selection to pause a game implemented by the asynchronous web application, and others. In general, a state change of the dynamic web application is associated with a change to a new view port or window, although other state changes may be possible.

The update module 118 receives portions of the content 120 for the dynamic web page responsive to the asynchronous requests previously made. The update module 118 causes the received portions of content 120 to be displayed upon a determination that the received portion of the content 120 is received responsive to an asynchronous request that was sent based on a user interaction associated with a current state of the dynamic web page. The update module 118 refrains from causing the display of updates upon a determination that the received portion of the content 120 is received responsive to an asynchronous request that is associated with an outdated state of the dynamic web page.

In one example, the dynamic web page may implement a web store, and the user interaction module 116 may receive data indicative of a user interaction requesting a details view of an item for sale. Before the content updates for the details view is fully displayed, the user may become impatient and select a link to a home view of the web store. One or more asynchronous requests are sent to the web server(s) 110 for content updates associated with the home view and content updates for the home view are received responsive to the asynchronous requests. Even though the loading of the details view was interrupted by the user interaction requesting the home view, asynchronous responses associated with content updates for the details view will continue to arrive from the web server(s) 110. Depending on various factors, such as a slow web server or other factor, some content updates associated with the details view may arrive out of order. That is, some content updates associated with the details view may arrive after content updates associated with the home view are re received, even though the details view was requested before the home view. The update module 118 determines that the content update for the details view is associated with an outdated state of the dynamic web page, and refrains from causing the outdated content updates to be displayed, such as for example by discarding or ignoring any content updates received in response to requests that are associated with an outdated state of the dynamic web page.

In embodiments, computer-readable storage media 126 and 128 may include volatile memory (such as RAM), non-volatile memory, removable memory, and/or non-removable memory, implemented in any method or technology for storage of information, such as computer-readable instructions, data structures, program modules, or other data. Also, the processor(s) 130 and 132 may include onboard memory in addition to or instead of the computer-readable storage media 126 and 128. Some examples of storage media that may be included in the computer-readable storage media 126 and 128 and/or within one or more of the processor(s) 130 and 132 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, other non-transitory computer storage media, or any other medium usable to store the desired information and that can be accessed by the client device 102 and/or the web server(s) 110. Any such computer-readable media may be part of the client device 102 and/or web server(s) 110.

The computer-readable storage media 126 and 128, meanwhile, may include software programs or other executable modules that may be executed by the processor(s) 130 and 132. Examples of such programs or modules include control modules (e.g., power management), network connection software, an operating system, sensor algorithms, and so forth. The computer-readable storage media 126 and 128 may also be used to store various databases.

Various processes, instructions, methods and techniques described herein may be considered in the general context of computer-executable instructions, such as program modules, that are executable by one or more computers or other devices. Generally, program modules include routines, programs, objects, components, data structures, etc. for performing particular tasks or implementing particular abstract data types. These program modules can be implemented as software modules that are executable on the processor(s) 130 and 132, as hardware, and/or as firmware. Typically, the functionality of the program modules may be combined or distributed as desired in various embodiments. An implementation of these modules and techniques may be stored on or transmitted across some form of computer-readable media.

The modules stored in one or more of computer-readable storage media 126 and 128 may be implemented across one or more servers in a cloud computing environment, on a local device, or on a combination of both. Embodiments do not limit the implementation of the modules stored in computer-readable storage media 126 and 128 to any particular device or environment.

Illustrative Communication Flow

Figure 2:
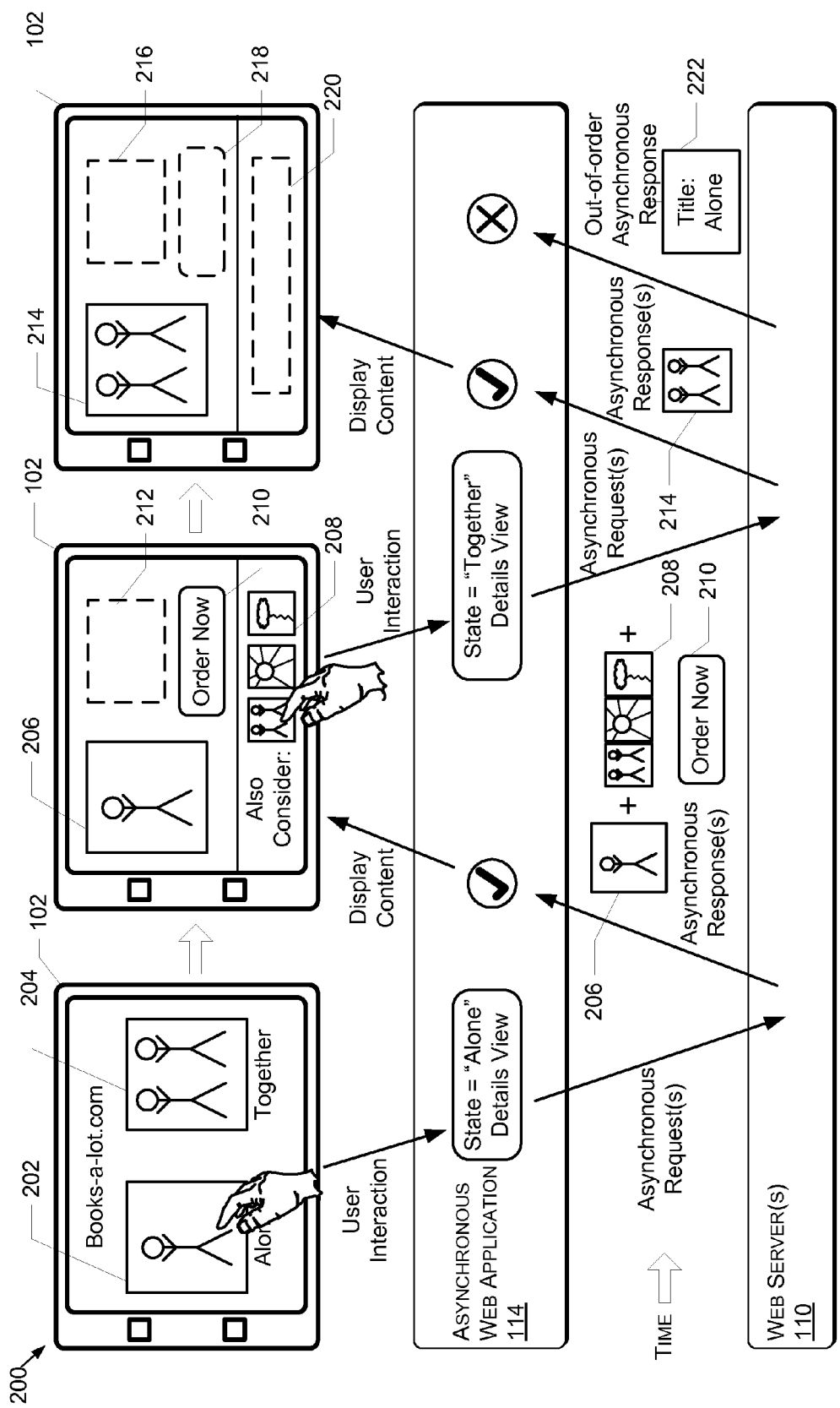
FIG. 2 illustrates an example communication flow for a dynamic web application.

FIG. 2 illustrates an example communication flow 200 for a dynamic web application. Client device 102 is shown in the upper left corner of FIG. 2 with a dynamic web page displayed on a touch-sensitive display screen. Client device 102 is shown in FIG. 2 as a tablet computer with a touch-sensitive display only for the sake of illustration. A tablet computer is just one example of a client device 102. The dynamic web page displayed on the display screen of the client device 102 implements a web store, "Books-a-lot.com," and a home view or screen of "Books-a-lot.com" includes a first book graphic 202 representing a book titled "Alone" and a second book graphic 204 representing a book titled "Together." The first and second book graphics 202 and 204 include links to display detail views for their respective books. A user is shown in FIG. 2 tapping on the first book graphic 202 thereby indicating a request for a details view of the "Alone" book.

The asynchronous web application 114 receives data indicative of the user interaction requesting the "Alone" details view and sets a current state of the dynamic web page to indicate that the current state is the "Alone" details view. The asynchronous web application 114 sends, based on the user interaction requesting the "Alone" details view, one or more asynchronous requests to the web server(s) 110 for content updates associated with the details view for the "Alone" book. The web server(s) 110 transmits one or more asynchronous responses including a portion of the content for the "Alone" details view. In particular, the web server(s) 110 transmits "Alone" book graphic 206, book thumbnails 208, and an "Order Now" button 210.

Upon receipt of the one or more asynchronous responses, the asynchronous web application 114 determines that the one or more asynchronous responses are received responsive to asynchronous requests associated with the current state of the dynamic web page. In this case, because the asynchronous web application 114 determines that the "Alone" book graphic 206, book thumbnails 208, and the "Order Now" button 210 are associated with the current state of the dynamic web page ("Alone" details view), the asynchronous web application 114 causes them to be displayed on the client device 102.

As shown in the top-middle portion of FIG. 2, the "Alone" details view is not fully displayed. There is a blank portion 212 that is not displayed because its associated content (in this case, book title content) has not been received from the web server(s) 110. The asynchronous web application 114 requests content updates in the background without impacting the interactive nature of the dynamic web page. Thus, a user may interact with the dynamic web page before all of its content updates are displayed. In the example shown in FIG. 2, the user selects one of the book thumbnails 208 before the book title content update for the blank portion 212 is received.

The book thumbnails 208 are links to other books that the user is invited to consider while viewing the "Alone" details view. In the example shown in FIG. 2, the user taps on the thumbnail for the "Together" book. The asynchronous web application 114 receives data indicative of the user interaction and determines—based for example on the user interaction list 124 shown in FIG. 1—that the user interaction requesting the "Together" details view indicates a change in state of the dynamic web page. Thus, the asynchronous web application 114 notes a change in the current state of the dynamic web page to be the "Together" details view.

The asynchronous web application 114 sends one or more asynchronous requests to the web server(s) 110 for the content updates associated with the "Together" details view based on the user interaction. The asynchronous web application 114 receives one or more asynchronous responses with the requested content updates from the web server(s) 110. In the example shown in FIG. 2, the asynchronous web application 114 receives a book graphic 214 for the "Together" book. The asynchronous web application 114 determines that the received book graphic 214 is associated with a current state of the dynamic web page ("Together" details view), and causes the book graphic 214 to be displayed on the display screen of the client device 102. Portions 216, 218, and 220 are not displayed because the content updates that go into those portions are not yet received by the asynchronous web application 114.

As noted earlier, the client device did not fully display the "Alone" details view because the client device 102 did not receive all content update associated with the "Alone" details view. In the example shown in FIG. 2, the asynchronous web application 114 receives from the web server(s) 110 a title component 222 for the "Alone" details view after receiving the book graphic 214 for the "Together" details view. The title component 222 is configured to be displayed in the blank portion 212 of the "Alone" details view. The asynchronous web application 114 determines that the title component 222 is received responsive to an asynchronous request that is associated with an outdated state of the dynamic web page (the "Alone" details view) and discards it without causing it to be displayed on the client device 102. Thus, the asynchronous web application 114 displays the "Together" details view in a way that refrains from displaying the content updates associated with an outdated state of the dynamic web page. Were the title component 222 to be displayed in the "Together" details view, the "Alone" title might appear in the portion 216 adjacent to the "Together" book graphic 214, thereby resulting in incorrect and confusing information being displayed to the user.

Although the example shown in FIG. 2 is for a web store, other dynamic web page types may also be implemented according to various embodiments. Also, although the example shown in FIG. 2 includes a second user interaction that occurs while a view port of a dynamic web page is only partially loaded, embodiments also handle other types of state changes. For example, referring to FIG. 2, the user may become impatient and select the "Together" view screen from the main screen after selecting the "Alone" details view but before any content updates associated with the "Alone" details view are received and/or caused to be displayed. In that case, all content updates associated with the "Alone" details view would be discarded without causing them to be displayed.

Illustrative Process for Dynamic Web Updates

Figure 3:
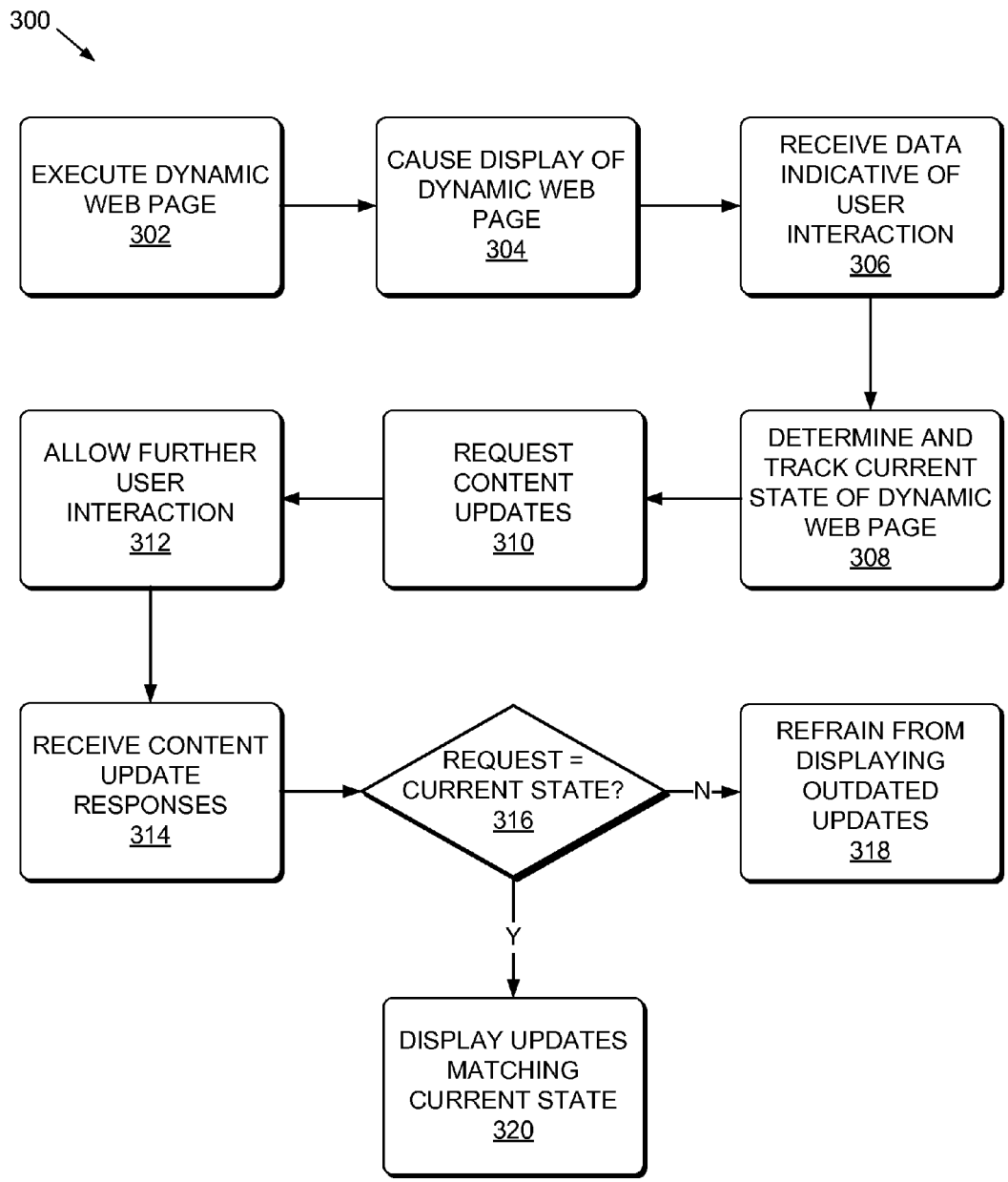
FIG. 3 shows an illustrative process for causing the display of dynamic web pages based on state.

FIG. 3 shows an illustrative process 300 for causing display of dynamic web pages based on state. The process 300 is described with reference to the preceding figures, and specifically with reference to FIGS. 1 and 2. The process 300 is illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure.

At 302, an asynchronous web application—such as the asynchronous web application 114—is executed within a browser window. The asynchronous web application may be retrieved from a web server, such as over the public Internet or other network. The asynchronous web application may include a dynamic web site. The asynchronous web application may include an Asynchronous JavaScript and XML (Ajax) application.

At 304, a dynamic web page is caused to be displayed within a browser window. Navigation within the dynamic web page does not cause the loading of a new browser window. Instead the dynamic web page loads content updates in the background, such as by selecting a new view port or window of the dynamic web page to present new content to the user. The asynchronous web application requests content updates to the dynamic web page without locking up the dynamic web page, thereby allowing the user to continue to view and interact with the dynamic web page while content updates are requested in the background. The dynamic web page may include electronic commerce content, a social networking site, a search engine, a weblog, or the like.

At 306, the asynchronous web application receives data indicative of one or more user interactions with the dynamic web page. The user interactions may include a mouse click, user tap or gesture within a touch-sensitive display area, a keyboard entry, and so forth.

At 308, the asynchronous web application determines and tracks a current state of the dynamic web page that results from the one or more user interactions with the asynchronous web page. This includes updating a current state of the dynamic web page based on a determination that a user interaction causes the dynamic web page to change state. The asynchronous web application determines the current state based on reference to a list of user interactions that result in changing the state of the dynamic web page. User interactions that result in changing the state of the dynamic web page may include pressing a back button, selecting a details view of an item for sale, selecting a link to a home view or screen of the dynamic web page, and selecting a purchase function of the dynamic web page, among others. Some user interactions may not cause a state change. Thus, tracking and determining the current state of the dynamic web application includes distinguishing between user interactions that result in the dynamic web page changing state and user interactions that result in the dynamic web page retaining its present state. A change in state may be associated with displaying of a new view port or window, although a change in state may include other aspects of the dynamic web page.

At 310, the asynchronous web application requests content updates from a remote source, such as from one or more web servers, based on at least some of the one or more user interactions. One or more requests are sent to the remote source based on the user interactions.

At 312, the asynchronous web application allows further user interaction with the dynamic web page while awaiting the content updates. Thus, the dynamic web page remains interactive during the time that the asynchronous web application waits for the response to the asynchronous requests, and the user may navigate within the dynamic web page and cause further requests for content updates while the page is still being received and/or displayed.

At 314, the asynchronous web application receives content updates from the remote source. The content updates are received responsive to the asynchronous requests for the content based on the user interactions.

At 316, the asynchronous web application determines that the received content updates are received responsive to user interactions associated with either an outdated state of the dynamic web page or a current state of the dynamic web page. The asynchronous web application matches the responses to the requests, determines a current state of the dynamic web page, and determines whether the requests are associated with an outdated or a current state of the dynamic web page.

At 318, the asynchronous web application refrains from causing the display of one or more of the content updates within the browser window that are responsive to user interactions associated with an outdated state of the dynamic web page. Thus, the ongoing displaying of the dynamic web page excludes a subset of the received content updates that are associated with an outdated state of the dynamic web page. The asynchronous web application may implement a state check bypass for special types of updates, thereby causing the updates to be displayed even upon a determination that the updates are associated with requests made during an outdated state of the dynamic web page. Examples of special types of updates may include, among other things, notifications that a charge has been made to the user's account, a notification that an order has been placed, an indication that a shopping cart has been updated, an indication that a user has logged on to their account, and so forth. Other types of updates may result in a bypass of the state check without departing from the scope of the present disclosure.

At 320, the asynchronous web application causes display of ones of the content updates within the browser window that are responsive to user interactions associated with current state of the dynamic web page.

The aforementioned techniques include a set of illustrative techniques for dynamic web updates based on a state of a dynamic web page. However other techniques may be employed to accomplish similar results.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions executable by one or more processors to cause the one or more processors to:
   cause display of a dynamic web page within a browser window;
   receive data indicative of a user interaction with the dynamic web page;

determine, from a type of the user interaction, that the user interaction changes a state of the dynamic web page from an old state to a new state;
store the new state in a state file as a current state of the dynamic web page;
send a request for first content from a remote source;
associate the request for the first content with the current state in the state file;
receive the first content from the remote source at a first time;
receive second content from the remote source at a second time later than the first time;
determine that the first content received from the remote source at the first time is associated with the request for the first content associated with the current state of the dynamic web page;
determine that the second content received from the remote source at the second time is not associated with the request for the first content associated with the current state of the dynamic web page;
update the dynamic web page with the first content; and
refrain from updating the dynamic web page with the second content based on the determination that the second content is not associated with the request for the first content associated with the current state of the dynamic web page.

2. The one or more non-transitory computer-readable media of claim 1, wherein the dynamic web page implements electronic commerce content.

3. The one or more non-transitory computer-readable media of claim 1, wherein the type of the user interaction includes one or more of: pressing a back button, selecting a details view of an item for sale, selecting a link to a home view of the dynamic web page, or selecting a purchase function of the dynamic web page.

4. The one or more non-transitory computer-readable media of claim 1, wherein the computer-executable instructions comprise an Asynchronous JavaScript and XML (Ajax) application that is executable within the browser window.

5. The one or more non-transitory computer-readable media of claim 1, wherein the computer-executable instructions are further executable by the one or more processors to cause the one or more processors to distinguish between a first type of user interaction that results in the dynamic web page changing state and a second type of user interaction that results in the dynamic web page retaining its current state.

6. A method comprising:
causing, by a computing system, display of content at least partially described by a markup language within a web view container of a native application;
determining, by the computing system, a state change of the web view container from an old state to a new state caused at least partly by user interaction with the content, wherein the state change is determined to occur based on a type of the user interaction;
storing, in a state file, the new state;
determining a current state based at least in part on the new state; and
causing, by the computing system, display of one or more updates to the content of the web view container that are received from a remote source, wherein the causing display includes causing display of a first update associated with the current state of the web view container and being received at a first time, and refraining from causing display of a second update received at a second time, later than the first time, the second update not associated with the current state of the web view container.

7. The method of claim 6, further comprising referencing a list of user interactions that cause the web view container to change state to determine that the type of the user interaction causes the state change.

8. The method of claim 6, further comprising distinguishing between a first type of user interaction that results in the web view container changing state and a second type of user interaction that results in the web view container retaining its current state.

9. The method of claim 6, wherein the specific executable instructions include an Asynchronous JavaScript and XML (Ajax) application.

10. The method of claim 6, wherein the content includes an electronic commerce store.

11. The method of claim 6, wherein the content is caused to be displayed on a touch-enabled display device.

12. The method of claim 6, wherein the type of the user interaction includes one or more of: pressing a back button, selecting a details view of an item for sale, selecting a link to a home view of the dynamic web page, or selecting a purchase function of the dynamic web page.

13. One or more non-transitory computer-readable media storing computer-executable instructions executable by one or more processors to cause the one or more processors to:
receive data indicative of a plurality of user interactions with content, the content at least partially described by a markup language and displayed within a web view container of a native application;
determine, from types of the plurality of user interactions, that at least one of the plurality of user interactions results in a change of the web view container from an old state to a current state;
store a list of the plurality of user interactions in a state file;
determine that a first update of a plurality of updates to the content that is received at a first time is associated with the current state of the web view container by determining that the first update is based at least partly on a first user interaction of the plurality of user interactions associated with the current state;
determine that a second update of the plurality of updates to the content that is received at a second time, later than the first time, is associated with the old state of the web view container by determining that the second update is provided based at least partly on a second user interaction of the plurality of user interactions associated with the old state; and
update the content with the first one of the plurality of updates.

14. The one or more non-transitory computer-readable media of claim 13, wherein the computer-executable instructions are further executable to refrain from updating the second one of the plurality of updates to the content.

15. The one or more non-transitory computer-readable media of claim 13, wherein the computer-executable instructions include an Asynchronous JavaScript and XML (Ajax) application.

16. The one or more non-transitory computer-readable media of claim 13, wherein the content includes at least one of an electronic commerce store, a social networking site, a search engine, or a weblog.

17. The one or more non-transitory computer-readable media of claim 13, wherein the plurality of user interactions are made via a mobile device.

18. The one or more non-transitory computer-readable media of claim 13, wherein the computer-executable instructions are further executable to reference the list of user interactions that result in state changes of the web view container.

19. The one or more non-transitory computer-readable media of claim 13, wherein the computer-executable instructions are further executable by the one or more processors to cause the one or more processors to distinguish between a first type of user interaction that results in the dynamic web page changing state and a second type of user interaction that results in the dynamic web page retaining its current state.

* * * * *